United States Patent
Ikeda et al.

(10) Patent No.: US 10,581,682 B2
(45) Date of Patent: Mar. 3, 2020

(54) IN-VEHICLE COMMUNICATION SYSTEM, DOMAIN MASTER, AND FIRMWARE UPDATE METHOD

(71) Applicant: RENESAS ELECTRONICS CORPORATION, Tokyo (JP)

(72) Inventors: Hiroyuki Ikeda, Tokyo (JP); Yuichi Iwaya, Tokyo (JP); Minoru Uemura, Tokyo (JP); Tatsuya Ishikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 127 days.

(21) Appl. No.: 15/845,778

(22) Filed: Dec. 18, 2017

(65) Prior Publication Data
US 2018/0212822 A1    Jul. 26, 2018

(30) Foreign Application Priority Data

Jan. 25, 2017   (JP) .................. 2017-011275

(51) Int. Cl.
| | |
|---|---|
| H04L 12/24 | (2006.01) |
| H04L 29/08 | (2006.01) |
| G06F 8/65 | (2018.01) |
| H04L 12/66 | (2006.01) |
| G06F 8/654 | (2018.01) |
| H04L 12/28 | (2006.01) |

(Continued)

(52) U.S. Cl.
CPC .............. *H04L 41/082* (2013.01); *G06F 8/65* (2013.01); *G06F 8/654* (2018.02); *H04L 12/28* (2013.01); *H04L 12/40* (2013.01); *H04L 12/4625* (2013.01); *H04L 12/66* (2013.01); *H04L 67/12* (2013.01); *G06F 8/66* (2013.01); *H04L 2012/40273* (2013.01)

(58) Field of Classification Search
CPC ....... H04L 41/082; H04L 12/28; H04L 12/66; H04L 67/12; G06F 8/654; G06F 8/65; G06F 8/66
See application file for complete search history.

(56) References Cited

U.S. PATENT DOCUMENTS 9,205,809 B2 * 12/2015 Becker .................... G06F 21/74
10,140,117 B2 * 11/2018 Annapureddy ......... G06F 8/654
(Continued)

FOREIGN PATENT DOCUMENTS

JP    2008-259124 A    10/2008

*Primary Examiner* — Blake J Rubin
(74) *Attorney, Agent, or Firm* — McDermott Will & Emery LLP

(57) ABSTRACT

It is possible to update firmware of domain masters during travelling. An in-vehicle communication system includes a plurality of domain masters, and a redundant domain master configured to be able to perform alternative operations of the plurality of domain masters. The domain masters transmits operation information to the redundant domain master prior to update of firmware. The redundant domain master executes the alternative operation of the domain master using the received operation information. The domain master receives, after the update of the firmware, operation information generated in the alternative operation from the redundant domain master and operates in the updated firmware.

10 Claims, 9 Drawing Sheets

(51) Int. Cl.
*H04L 12/46* (2006.01)
*H04L 12/40* (2006.01)

(56) References Cited

U.S. PATENT DOCUMENTS

| | | | | |
|---|---|---|---|---|
| 2004/0054883 | A1* | 3/2004 | Goodman | G06F 8/65 |
| | | | | 713/1 |
| 2005/0251673 | A1* | 11/2005 | Bosley | G06F 11/1433 |
| | | | | 713/2 |
| 2006/0085564 | A1* | 4/2006 | Bomhoff | G06F 8/65 |
| | | | | 710/8 |
| 2014/0164579 | A1* | 6/2014 | Douthitt | G07C 5/008 |
| | | | | 709/219 |
| 2015/0019692 | A1* | 1/2015 | Chandaria | H04L 67/34 |
| | | | | 709/219 |
| 2015/0220319 | A1* | 8/2015 | Weiss | G06F 21/572 |
| | | | | 713/168 |
| 2015/0281374 | A1* | 10/2015 | Petersen | H04L 67/12 |
| | | | | 709/223 |
| 2016/0196132 | A1* | 7/2016 | Searle | H04L 41/082 |
| | | | | 717/173 |
| 2016/0259639 | A1* | 9/2016 | Blaschke | G06F 8/65 |
| 2016/0306624 | A1* | 10/2016 | Vangelov | G06F 8/654 |
| 2017/0086241 | A1* | 3/2017 | Lopes | H04L 12/4641 |
| 2017/0134164 | A1* | 5/2017 | Haga | B60R 16/023 |
| 2017/0195459 | A1* | 7/2017 | e Costa | H04L 67/34 |
| 2018/0089435 | A1* | 3/2018 | Zander | G06F 21/575 |
| 2018/0102901 | A1* | 4/2018 | Linton | H04L 9/3218 |
| 2018/0212967 | A1* | 7/2018 | Chen | H04L 63/10 |

* cited by examiner

IN-VEHICLE COMMUNICATION SYSTEM, DOMAIN MASTER, AND FIRMWARE UPDATE METHOD

CROSS-REFERENCE TO RELATED APPLICATIONS

This application is based upon and claims the benefit of priority from Japanese patent application No. 2017-011275, filed on Jan. 25, 2017, the disclosure of which is incorporated herein in its entirety by reference.

BACKGROUND

The present disclosure relates to an in-vehicle communication system, and relates to, for example, an in-vehicle communication system mounted on a vehicle. Further, the present disclosure relates to a domain master and a firmware update method, and relates to, for example, a domain master used for an in-vehicle communication system, and a firmware update method of the domain master.

Japanese Unexamined Patent Application Publication No. 2008-259124 discloses an in-vehicle communication system. The in-vehicle communication system disclosed in Japanese Unexamined Patent Application Publication No. 2008-259124 includes a plurality of electronic control units (ECUs) and a communication data relay apparatus. In the in-vehicle communication system disclosed in Japanese Unexamined Patent Application Publication No. 2008-259124, the plurality of ECUs are divided into groups for each functional group such as a power train system, a chassis system, a body system, and an Advanced Driving Assistant System (ADAS), and ECUs that belong to one group (one domain) are configured to be able to communicate with one another via a bus provided for each functional group.

In the in-vehicle communication system disclosed in Japanese Unexamined Patent Application Publication No. 2008-259124, a communication data mediation apparatus is arranged between buses whose functional groups are different from each other, and relays communication between different domains. In the in-vehicle communication system disclosed in Japanese Unexamined Patent Application Publication No. 2008-259124, data can be shared among different functional groups by using the communication data mediation apparatus.

In the in-vehicle communication system disclosed in Japanese Unexamined Patent Application Publication No. 2008-259124, the ECU that connects the buses whose functional groups are different from each other includes abnormality detection means for detecting an abnormality of the communication data mediation apparatus. The ECU further includes taking-over means for taking over the functions of the communication data mediation apparatus when an abnormality of the communication data mediation apparatus has been detected. In the in-vehicle communication system disclosed in Japanese Unexamined Patent Application Publication No. 2008-259124, even when there is an abnormality in the communication data mediation apparatus, the ECU that connects the buses whose functional groups are different from each other serves as the communication data mediation apparatus, whereby data sharing among different functional groups is continued.

In recent years, in accordance with an increase in the amount of data communicated on a vehicle network system, an in-vehicle communication system may be configured to include a domain master (hereinafter this may be also referred to as a DM) that aggregates communication networks in functional domains such as a controller area network (CAN) for each functional group of the vehicle and a gateway (hereinafter this may be also referred to as a GW) that aggregates high-speed communication networks that connect the functional domains. When reprogramming of an embedded control program (firmware) of the DM is performed in this network configuration, data necessary for the reprogramming is delivered to the DM from the GW via the high-speed communication network, and the reprogramming of the embedded control program is executed in the DM.

While the aforementioned reprogramming of the embedded control program of the DM is being performed, the function of the DM is stopped. When the reprogramming of the embedded control program of the DM is executed while the vehicle is being stopped, various types of control do not need to be executed in the functional domains. Therefore, no problem occurs even when the DM stops its functions during the reprogramming.

In recent years, because of the achievement of Firmware On-The-Air (FOTA), it might seem like it would be possible to execute reprogramming of the embedded control program of the DM not only while the vehicle is not travelling, but also while the vehicle is travelling. However, while the vehicle is travelling, various types of control need to be executed in the functional domains, and the functions of the DM cannot be stopped. Therefore, it is impossible to execute reprogramming of the embedded control program of the DM while the vehicle is travelling.

Japanese Unexamined Patent Application Publication No. 2008-259124 merely discloses detecting an abnormality of the communication data mediation apparatus and taking over, by the ECU, the functions of the communication data mediation apparatus. Accordingly, Japanese Unexamined Patent Application Publication No. 2008-259124 does not provide technical means for allowing the embedded control program of the DM to be updated while the vehicle is travelling.

The other problems and the novel characteristics will be made apparent from the descriptions of this specification and the attached drawings.

SUMMARY

According to one embodiment, an in-vehicle communication system includes a plurality of domain masters, and a redundant domain master configured to be able to perform alternative operations of the plurality of domain masters, in which a domain master whose firmware is to be updated transmits operation information to the redundant domain master prior to update of firmware, the redundant domain master executes the alternative operation using the received operation information, and the domain master receives, after the update of the firmware, operation information generated in the alternative operation from the redundant domain master and operates in the updated firmware.

According to the embodiment, it is possible to update firmware of a domain master without stopping the function as the domain master while a vehicle is travelling.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
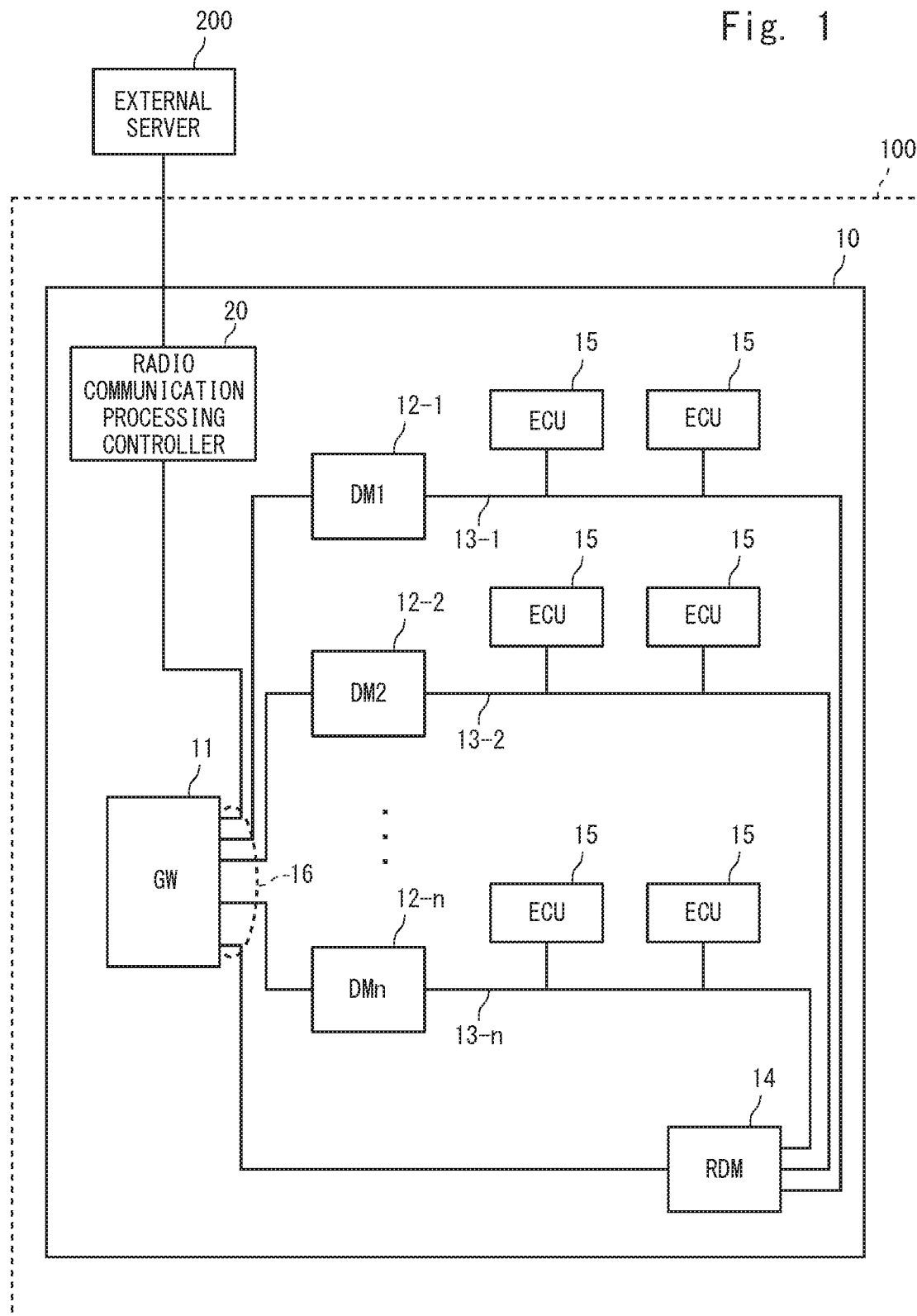
FIG. 1 is a block diagram showing a whole configuration of a system including an in-vehicle communication system according to a first embodiment.

In the following description, with reference to the drawings, embodiments to which the aforementioned means for solving the problem is applied will be described in detail. For the clarification of the description, the following description and the drawings may be omitted or simplified as appropriate. Further, each element shown in the drawings as functional blocks that perform various processing can be formed of a central processing unit (CPU), a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

The aforementioned program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

In the following embodiments, when necessary, an explanation will be given by using separate sections or separate embodiments. However, these embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following embodiments, the components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the like that are substantially similar to or resemble that shape are also included in that shape except for cases where it is explicitly specified or they are eliminated based on its principle. This is also true for the above-described number or the like (including numbers, values, quantities, ranges, and the like).

First Embodiment

FIG. 1 shows a whole configuration of a system including an in-vehicle communication system according to a first embodiment. This system includes an in-vehicle communication system 10 and an external server 200. The in-vehicle communication system 10 includes a gateway (GW) 11, domain masters (DMs) 12-1 to 12-n, a redundant domain master (RDM) 14, Electronic Control Units (ECUs) 15, and a radio communication processing controller (radio communication circuit) 20. Note that n is an integer equal to or larger than 2. The in-vehicle communication system 10 is mounted on, for example, a vehicle 100 such as an automobile. The ECUs 15 are connected to, for example, a sensor, an actuator, and the like, and are used to execute various types of control in the vehicle 100.

The in-vehicle communication system 10 includes low-speed networks 13-1 to 13-n and a high-speed network 16. In the in-vehicle communication system 10, the ECUs 15 are divided into groups for each of functional domains categorized by functions such as a power train system that controls an engine and the like, a chassis system that controls steering and the like, and a body system that controls interior elements such as an air conditioner and doors. The low-speed networks 13-1 to 13-n respectively connect one or more ECUs 15 and the domain masters 12-1 to 12-n in the respective functional domains. A CAN bus is used, for example, as the low-speed networks 13-1 to 13-n.

Each of the plurality of domain masters 12-1 to 12-n is constituted, for example, as an electronic control unit including a processor and a memory. The plurality of domain masters 12-1 to 12-n include functions of aggregating the low-speed networks 13-1 to 13-n in the functional domains, respectively. In other words, the plurality of domain masters 12-1 to 12-n respectively control communications in the low-speed networks 13-1 to 13-n in the functional domains. Each of the plurality of domain masters 12-1 to 12-n operates based on an embedded control program (firmware).

The plurality of domain masters 12-1 to 12-n are connected to the gateway 11 via the high-speed communication network 16. The communication speed of the high-speed communication network 16 is faster than that of the low-speed networks 13-1 to 13-n and the communication capacity of the high-speed communication network 16 is larger than that of the low-speed networks 13-1 to 13-n. Ethernet (registered trademark) is used, for example, for the high-speed network 16. The gateway 11 has a function of aggregating the high-speed communication network 16 that connects the functional domains. The communication between the functional domains is executed via the gateway 11.

For example, the domain master (DM1) 12-1 is connected to the low-speed network 13-1, and controls communication between the ECUs 15 connected to the low-speed network 13-1. Further, the domain master (DM1) 12-1 communicates with the domain masters (DM2) 12-2 to (DMn) 12-n in other functional domains via the high-speed network 16 and the gateway 11, transmits data in the functional domain to another functional domain, and receives, from still another functional domain, the data in the other functional domain. In the following explanation, the domain masters 12-1 to 12-n and the low-speed networks 13-1 to 13-n are simply referred to as the domain master 12 and the low-speed network 13, respectively, when it is not necessary to differentiate them.

The redundant domain master 14 is connected to the low-speed networks 13-1 to 13-n in the respective functional domains and the high-speed network 16. The redundant domain master 14 is configured in such a way that it is capable of performing alternative operations of the plurality of domain masters 12-1 to 12-n. The redundant domain master 14 performs, for example, when a domain master 12 is executing reprogramming (update of the firmware) of the embedded control program, the alternative operation of the domain master 12.

When the redundant domain master 14 executes the alternative operation of the domain master (DM1) 12-1, for example, the redundant domain master 14 controls communication between the ECUs 15 connected to the low-speed network 13-1. Further, the redundant domain master 14 communicates with the domain masters (DM2) 12-2 to (DMn) 12-n in the other functional domains via the gateway 11 and the high-speed network 16, transmits the data in the functional domain to another functional domain, and receives, from still another functional domain, the data in the other functional domain. The redundant domain master 14 is configured, for example, as the electronic control unit including the processor and the memory, similar to the domain master 12. The redundant domain master 14 operates based on the firmware.

The radio communication processing controller 20 is connected to the gateway 11 via the high-speed network 16 and is connected to the external server (communication apparatus) 200 which is provided outside of the vehicle 100 via a radio communication network such as a mobile telephone (data) communication network. The radio communication processing controller 20 controls radio communication processing between the gateway 11 and the external server 200. The radio communication processing controller 20 performs radio communication with the external server 200 and receives update data of the firmware of the domain master 12 from the external server 200. The reception of the update data is executed while the vehicle 100 is travelling. When the radio communication processing controller 20 receives the update data, the gateway 11 transmits the update data to the domain master 12 whose firmware is to be updated.

[Hardware Configuration of DM and RDM]

Figure 2:
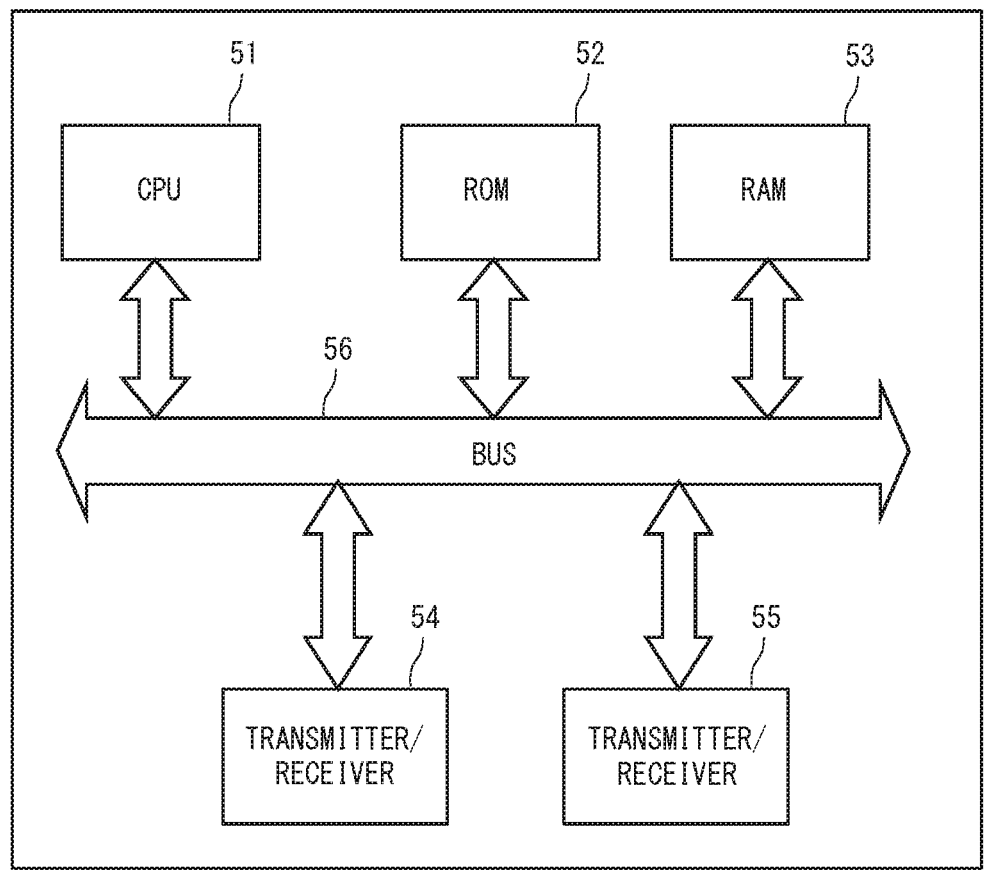
FIG. 2 is a block diagram showing a hardware configuration of an electronic control unit.

FIG. 2 shows a configuration of the electronic control unit (electronic control device) that can be used as the domain master 12 and the redundant domain master 14. An electronic control unit 50 includes a CPU 51, a ROM 52, a RAM 53, a transmitter/receiver 54, and a transmitter/receiver 55. The CPU 51 constitutes a processing execution unit in the electronic control unit 50, and executes various kinds of processing. The ROM 52 is, for example, a non-volatile memory such as a flash memory. The RAM 53 is a volatile memory that stores various types of data.

The ROM 52 stores the embedded control program (firmware) and the like executed by the CPU 51. The CPU 51 operates in accordance with the firmware read out from the ROM 52 and executes various kinds of processing. When, for example, the electronic control unit 50 is used as the domain master 12, the ROM 52 stores the firmware to achieve the function of aggregating the low-speed network 13 (see FIG. 1) in the functional domains, and the CPU 51 reads out this firmware to execute processing for aggregating the functional domains. When the electronic control unit 50 is used as the redundant domain master 14, the ROM 52 stores the firmware of the plurality of domain masters 12-1 to 12-n, and the CPU 51 reads out the firmware of the domain master 12 whose operation is alternatively performed by the redundant domain master 14 from the ROM 52 and executes the alternative operation of the domain master 12.

The transmitter/receiver 54 is connected to the low-speed network 13 in the functional domain and receives data from the ECU 15 in the functional domain via the low-speed network 13. Further, the transmitter/receiver 54 transmits data to the ECU 15 in the functional domain to the low-speed network 13. On the other hand, the transmitter/receiver 55 is connected to the high-speed network 16 and communicates with the gateway 11 via the high-speed network 16. In the electronic control unit 50, the ROM 52, the RAM 53, the transmitter/receiver 54, the transmitter/receiver 55 and the like are connected to the CPU 51 via a bus 56.

The ECU 15 may include a configuration similar to that of the electronic control unit 50 shown in FIG. 2. However, the ECU 15 does not need to include the transmitter/receiver 55 connected to the high-speed network 16. The ECU 15 may include, besides the components shown in FIG. 2, for example, a sensor interface connected to various types of sensors, an actuator interface connected to the actuator, and the like. When the electronic control unit 50 is used as the ECU 15, the CPU 51 performs various operations based on, for example, sensor information input via the sensor interface. Further, the CPU 51 executes various types of control by driving the actuator via the actuator interface.

[Domain Master]

Figure 3:
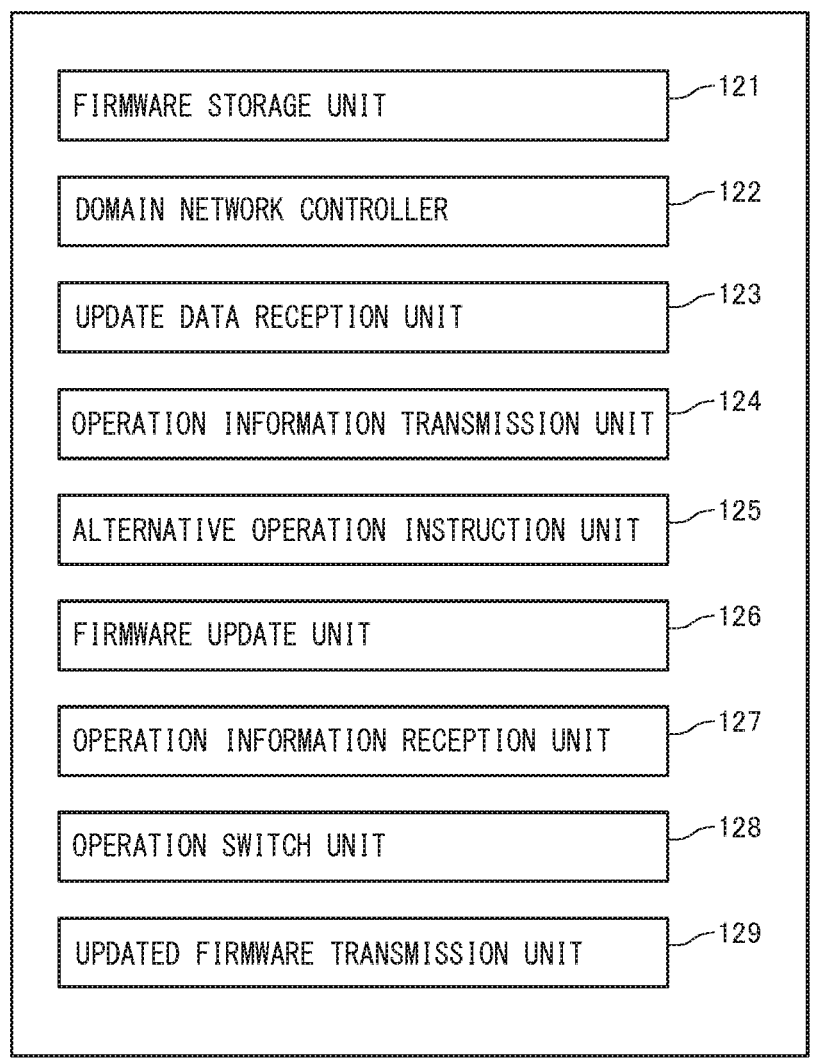
FIG. 3 is a functional block diagram showing a domain master.

FIG. 3 shows a functional block of the domain master 12. The domain master 12 includes a firmware storage unit (firmware storage) 121, a domain network controller 122, an update data reception unit (update date receiver) 123, an operation information transmission unit (operation information transmitter) 124, an alternative operation instruction unit (alternative operation instruction module) 125, a firmware update unit (firmware update module) 126, an operation information reception unit (operation information receiver) 127, an operation switch unit (operation switch module) 128, and an updated firmware transmission unit (updated firmware transmitter) 129. In the domain master 12, the functions of the domain network controller 122, the update data reception unit 123, the operation information transmission unit 124, the alternative operation instruction unit 125, the firmware update unit 126, the operation information reception unit 127, the operation switch unit 128, and the updated firmware transmission unit 129 may be achieved by the CPU 51 operating in accordance with the program read out from the ROM 52 (see FIG. 2).

The firmware storage unit 121 stores the firmware that defines the operations of the domain master 12. The firmware storage unit 121 is provided, for example, inside the ROM 52. The domain network controller 122 controls the low-speed network 13 in the functional domain. The domain network controller 122 controls the low-speed network 13 in the functional domain in accordance with the firmware stored in the firmware storage unit 121. The domain network controller 122 monitors, for example, the CAN communication in the low-speed network 13, generates CAN communication information (communication monitoring information), and stores the generated information in the RAM 53.

The update data reception unit 123 receives data (update data) for reprogramming the embedded control program from the gateway 11. The operation information transmission unit 124 transmits operation information generated by the domain network controller 122 to the redundant domain master 14 prior to the reprogramming of the embedded control program (update of the firmware). The operation information includes, for example, information such as the CAN communication information stored in the RAM 53, register configuration information and the like. The alternative operation instruction unit 125 instructs the redundant domain master 14 to perform the alternative operation of the domain master 12. The firmware update unit 126 causes the domain network controller 122 to stop operations based on the firmware and updates the firmware based on the update data. The firmware update unit 126 stores the updated firmware in the firmware storage unit 121.

The operation information reception unit 127 receives the operation information generated in the alternative operation of the domain master 12 executed in the redundant domain master 14 from the redundant domain master 14. The operation information reception unit 127 stores the received operation information in the RAM 53. The operation switch unit 128 instructs the domain network controller 122 to start operations (operation recovery) based on the firmware updated by the firmware update unit 126. The domain network controller 122 starts operations based on the updated firmware using the operation information received by the operation information reception unit 127. The updated firmware transmission unit 129 transmits the updated firmware to the redundant domain master 14 after the firmware is updated.

[Redundant Domain Master]

Figure 4:
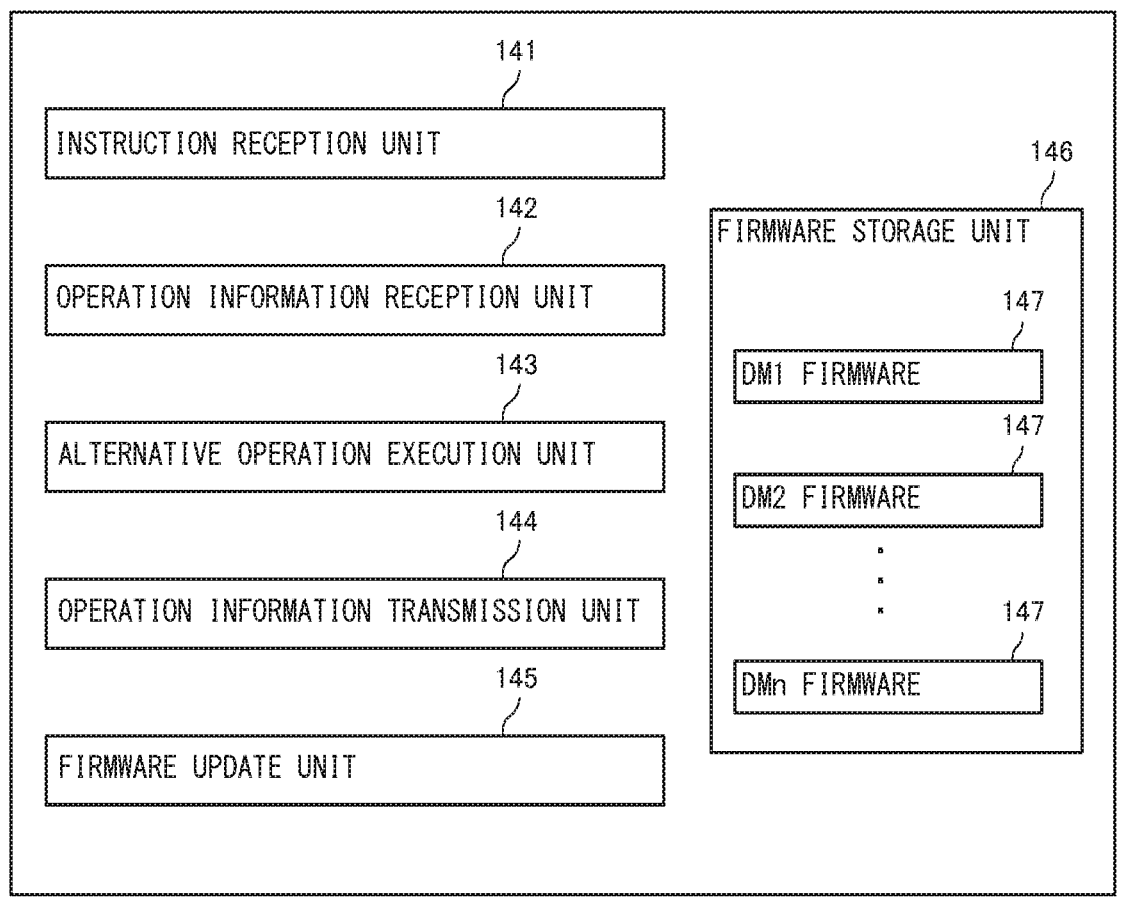
FIG. 4 is a functional block diagram showing a redundant domain master.

FIG. 4 shows a functional block of the redundant domain master 14. The redundant domain master 14 includes an instruction reception unit 141, an operation information reception unit (operation information receiver) 142, an alternative operation execution unit (alternative operation execution module) 143, an operation information transmission unit (operation information transmitter) 144, a firmware update unit (firmware update module) 145, and a firmware storage unit (firmware storage) 146. In the redundant domain master 14, each of the functions of the instruction reception unit 141, the alternative operation execution unit 143, the operation information transmission unit 144, and the firmware update unit 145 may be achieved by the CPU 51 operating in accordance with the program read out from the ROM 52 (see FIG. 2).

The instruction reception unit 141 receives an instruction for the alternative operation from the alternative operation instruction unit 125 (see FIG. 3) of the domain master 12 whose firmware is to be updated. The operation information reception unit 142 receives the operation information generated in the domain master 12 from the operation information transmission unit 124 of the domain master 12. The operation information reception unit 142 stores the received operation information in the RAM 53 or the like.

The firmware storage unit 146 stores the firmware of the domain master 12. More specifically, the firmware storage unit 121 stores firmware 147 of the plurality of respective domain masters (DM1) 12-1 to (DMn) 12-n (see FIG. 1). The alternative operation execution unit 143 reads out, when the instruction reception unit 141 receives the instruction for the alternative operation from the domain master 12, the firmware of the domain master 12 that has instructed the alternative operation from the firmware storage unit 146. The alternative operation execution unit 143 executes the alternative operation of the domain master 12 whose firmware is to be updated using the operation information received by the operation information reception unit 142.

The alternative operation execution unit 143 controls the low-speed network 13 in the functional domain in place of the domain master 12 in accordance with the firmware read out from the firmware storage unit 146. The alternative operation execution unit 143 monitors, for example, the CAN communication in the low-speed network 13, generates the CAN communication information and the like, and stores the generated information in the RAM 53. The operation information transmission unit 144 transmits the operation information generated in the alternative operation of the domain master 12 to the operation information reception unit 127 of the domain master 12.

The firmware update unit 145 receives the updated firmware from the updated firmware transmission unit 129 of the domain master 12. Upon receiving the updated firmware, the firmware update unit 145 stores this firmware in the firmware storage unit 146. Upon receiving the updated firmware from the updated firmware transmission unit 129 of the domain master (DM1) 12-1, for example, the firmware update unit 145 overwrites the firmware 147 for DM1 stored in the firmware storage unit 146 by the received firmware, to thereby update the firmware stored in the firmware storage unit 146.

[Operation Procedure]

Figure 5:
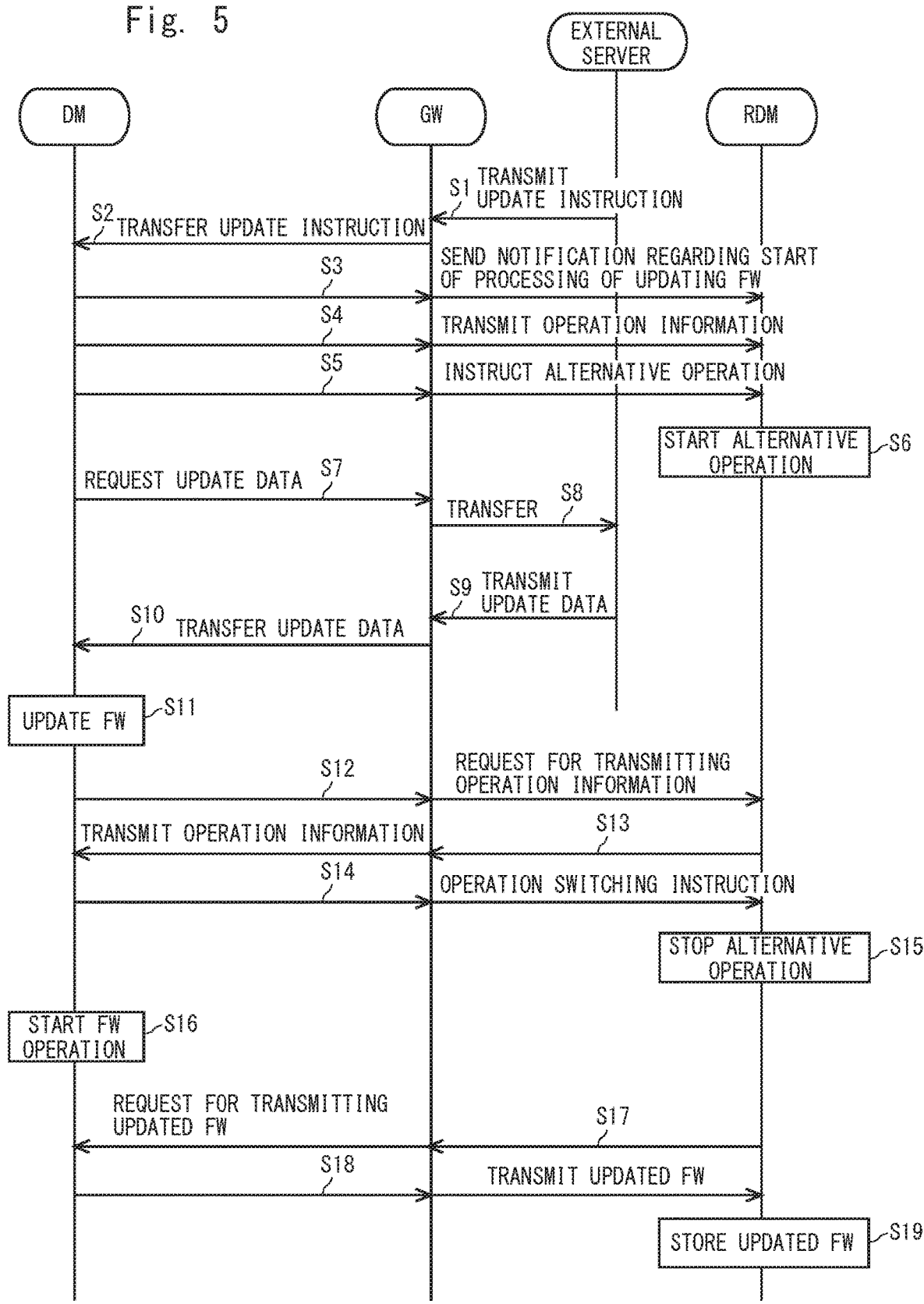
FIG. 5 is a sequence diagram showing an operation procedure of the in-vehicle communication system when firmware is updated.

FIG. 5 shows an operation procedure of the in-vehicle communication system 10 when the firmware is updated. The external server 30 transmits the instruction for updating the firmware to the domain master 12 to be updated while the vehicle 100 is travelling (Step S1). The gateway 11 receives the instruction for updating the firmware via the radio communication processing controller 20 (see FIG. 1), and transfers the update instruction to the domain master 12 whose firmware is to be updated via the high-speed network 16 (Step S2). The domain master 12 that has received the update instruction notifies the redundant domain master of the start of processing of updating the firmware via the gateway 11 and the high-speed network 16 (Step S3). The redundant domain master 14 starts, upon receiving the notification regarding the start of update processing, the CAN communication in the low-speed network 13.

The operation information transmission unit 124 (see FIG. 3) of the domain master 12 transmits the operation information including information on the RAM 53 (see FIG. 2) and the register configuration information to the redundant domain master 14 via the gateway 11 and the high-speed network 16 (Step S4). The operation information reception unit 142 (see FIG. 4) of the redundant domain master 14 stores the received operation information in the RAM 53 or the like of the redundant domain master 14. At this time, the operation information reception unit 142 monitors the CAN communication in the low-speed network 13 and updates the CAN communication information generated while the operation information is being received.

The alternative operation instruction unit 125 of the domain master 12 transmits the instruction for the alternative operation to the redundant domain master 14 via the gateway 11 and the high-speed network 16 (Step S5). The instruction reception unit 141 of the redundant domain master 14 receives the instruction transmitted from the domain master 12. The alternative operation execution unit 143 reads out the firmware 147 of the domain master 12 that has instructed the alternative operation from the firmware storage unit 146. The alternative operation execution unit 143 starts the alternative operation of the domain master 12 using the operation information transmitted in Step S4 (Step S6). The domain network controller 122 of the domain master 12 stops operating after the transmission of the instruction for the alternative operation.

The domain master 12 transmits the instruction for transmitting the update data (update data request) to the external server 200 (Step S7). The gateway 11 receives the update data request via the high-speed network 16 and transfers the update data request to the external server 200 via the radio communication processing controller 20 (Step S8). When the external server 200 receives the update data request, the external server 200 transmits the update data of the firmware to the domain master 12 that has transmitted the update data request (Step S9). The gateway 11 receives the update data of the firmware via the radio communication processing controller 20 and transfers the update data to the domain master 12 via the high-speed network 16 (Step S10).

The update data reception unit 123 of the domain master 12 receives the update data of the firmware from the gateway 11. The firmware update unit 126 updates the firmware based on the update data received by the update data reception unit 123 (Step S11). The firmware update unit 126 stores the updated firmware in the firmware storage unit 121. The domain master 12 starts the CAN communication in the low-speed network 13 after the firmware is updated.

While the update of the firmware is being executed in the domain master 12, the alternative operation execution unit 143 of the redundant domain master 14 updates the information stored in the RAM 53 and the register configuration information in the alternative operation of the domain master 12. The operation information reception unit 127 of the domain master 12 transmits the request for transmitting the operation information to the redundant domain master 14 via the gateway 11 and the high-speed network 16 (Step S12).

The operation information transmission unit 144 of the redundant domain master 14 transmits the operation information including the information updated in the alternative operation and the register configuration information to the domain master 12 via the gateway 11 and the high-speed network 16 (Step S13). The operation information reception unit 127 of the domain master 12 stores the received operation information in the RAM 53 or the like in the domain master 12. At this time, the operation information reception unit 127 monitors the CAN communication in the low-speed network 13 and updates the CAN communication information that has been generated while the operation information is being received.

The operation switch unit 128 of the domain master 12 transmits an operation switching instruction to the redundant domain master 14 via the gateway 11 and the high-speed network 16 (Step S14). The alternative operation execution unit 143 of the redundant domain master 14 receives the operation switching instruction from the domain master 12 and stops the alternative operation of the domain master 12 (Step S15).

The operation switch unit 128 transmits the operation switching instruction also to the domain network controller 122 in the domain master 12. The domain network controller 122 reads out the updated firmware from the firmware storage unit 121. The domain network controller 122 starts operations based on the updated firmware using the operation information transmitted from the redundant domain master 14 in Step S13 (Step S16).

The firmware update unit 145 of the redundant domain master 14 transmits the request for transmitting the updated firmware to the domain master 12 via the gateway 11 and the high-speed network 16 at a desired timing after the alternative operation is stopped (Step S17). The updated firmware transmission unit 129 of the domain master 12 receives the request for transmitting the updated firmware, and transmits the updated firmware to the redundant domain master 14 via the gateway 11 and the high-speed network 16 (Step S18).

The firmware update unit 145 of the redundant domain master 14 stores the updated firmware transmitted in Step S18 in the firmware storage unit 146 (Step S19). Since the updated firmware is stored also in the firmware storage unit 146 of the redundant domain master 14, the redundant domain master 14 is able to execute the alternative operation based on the updated firmware next time it receives an instruction from the domain master 12 to perform the alternative operation.

[Conclusion]

In recent years, since there has been an increasing demand for mounting a Firmware On-The-Air (FOTA) function on the electronic control unit that is mounted on a vehicle, it is expected that the FOTA function will be executed in the electronic control unit that serves as the domain master 12 while the vehicle is travelling. In order for each of the domain masters 12 to execute the update of the firmware without stopping its function, each of the domain masters 12 needs to additionally include a CPU that addresses the aforementioned function and performance and to include a memory whose capacity is twice as large as that of the existing system. Accordingly, in this case, it is required to re-design (newly develop) the hardware configuration of all the domain masters 12.

In this embodiment, the in-vehicle communication system 10 includes the redundant domain master 14 capable of performing the alternative operations of the plurality of domain masters 12, the redundant domain master 14 performs, while the update of the firmware is being executed in one domain master 12, the operation of the domain master 12 by taking over the operation of the domain master 12. After the update of the firmware, the domain master 12 starts operating again. Accordingly, the firmware of the domain master 12 can be updated even while the vehicle 100 is travelling. In this embodiment, it is sufficient that only one electronic control unit that serves as the redundant domain master 14 be added, whereby it is possible to execute the FOTA function while the vehicle is travelling without changing the hardware configuration of the existing domain master 12.

In this embodiment, the domain master 12 transmits the operation information used for the network control of the functional domains to the redundant domain master 14 prior to the update of the firmware. The redundant domain master 14 executes the alternative operation of the domain master 12 using the received operation information and updates the operation information in the alternative operation. The redundant domain master 14 transmits the operation information updated (generated) in the alternative operation to the domain master 12, and the domain master 12 operates based on the firmware after the update using the received operation information. Accordingly, it is possible to prevent a lack of operation information of the system during the update of the firmware when the domain master 12 recovers from the update of the firmware to the normal operating state.

Second Embodiment

Next, a second embodiment will be explained. The configuration of an in-vehicle communication system according to this embodiment may be similar to that of the in-vehicle communication system 10 according to the first embodiment shown in FIG. 1. In the first embodiment, the example in which CAN communication is executed in the low-speed network 13 in the functional domains has been mainly described. The in-vehicle communication system according to this embodiment is different from the in-vehicle communication system 10 according to the first embodiment in that Local Interconnect Network (LIN) communication is executed in the low-speed network 13 in the functional domain. The points other than this point may be similar to those in the first embodiment.

The LIN communication performs communication in a single master communication system, unlike the CAN communication. While the domain master 12 is operating, the domain master 12 is set to the LIN master, and the domain master 12, which is the LIN master, controls communication of the low-speed network 13. When the firmware is updated in the domain master 12, the redundant domain master 14 is set to the LIN master, and the redundant domain master 14 set to the LIN master controls communication of the low-speed network 13.

[Domain Master]

Figure 6:
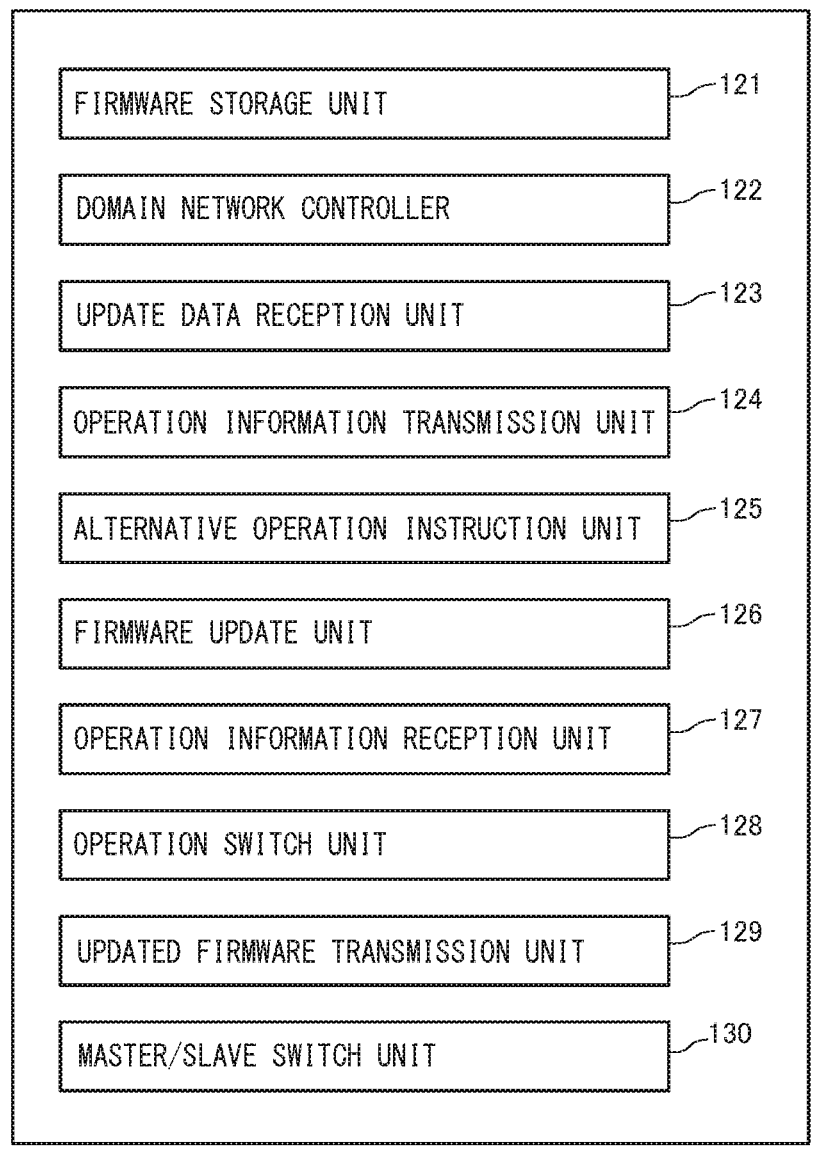
FIG. 6 is a functional block diagram showing a domain master used in a second embodiment.

FIG. 6 is a functional block of the domain master used in the in-vehicle communication system according to this embodiment. A domain master 12a used in this embodiment includes, besides the elements of the domain master 12 according to the first embodiment shown in FIG. 3, a master/slave switch unit 130. The master/slave switch unit 130 sets the redundant domain master 14 to the LIN master when the firmware is updated. Further, the master/slave switch unit 130 sets the domain master 12 to the LIN slave.

[Redundant Domain Master]

Figure 7:
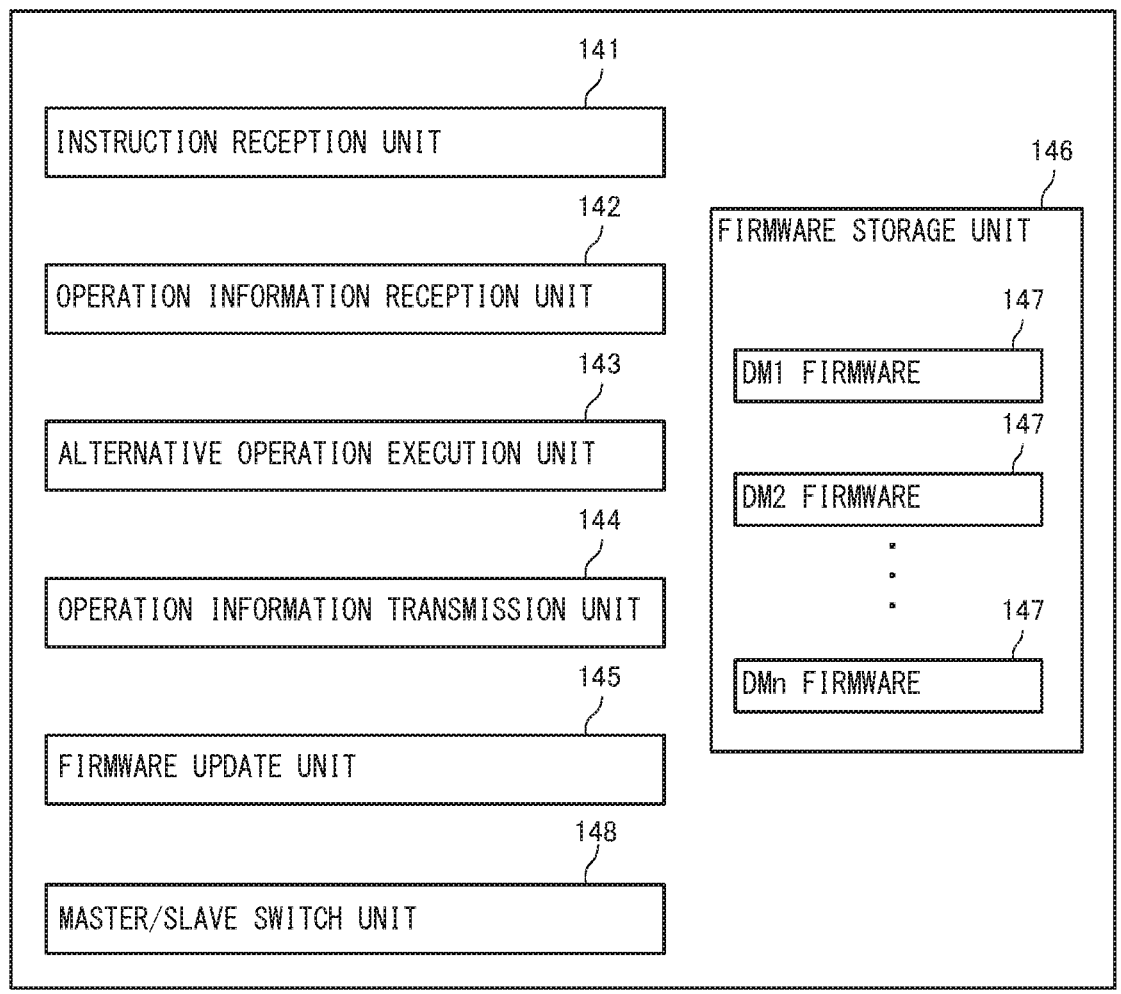
FIG. 7 is a functional block diagram showing a redundant domain master used in the second embodiment.

FIG. 7 shows a functional block of the redundant domain master used in the in-vehicle communication system according to this embodiment. A redundant domain master 14a used in this embodiment includes, besides the elements of the redundant domain master 14 according to the first embodiment shown in FIG. 4, a master/slave switch unit 148. The master/slave switch unit 148 sets the domain master 12 to the LIN master when the update of the firmware is executed in the domain master 12 and the domain master 12 starts operating again. Further, the master/slave switch unit 148 sets the redundant domain master 14 to the LIN slave.

[Conclusion]

In this embodiment, each of the domain master 12 and the redundant domain master 14 includes a function of switching the LIN master and the LIN slave. In the normal operation in which the update of the firmware is not executed in the domain master 12, the domain master 12 serves as the LIN master and the redundant domain master 14 serves as the LIN slave. When the firmware is updated in the domain master 12, the domain master 12 serves as the LIN slave and the redundant domain master 14 serves as the LIN master. By switching the LIN master and the LIN slave as stated above, in the procedure similar to that described in the first embodiment, it is possible to make the redundant domain master 14 take over the operations of the domain master 12 and make the domain master 12 start operating again after the firmware is updated.

Third Embodiment

Next, a third embodiment will be explained. The configuration of an in-vehicle communication system according to this embodiment may be similar to the configuration of the in-vehicle communication system 10 according to the first embodiment shown in FIG. 1. The in-vehicle communication system according to this embodiment is different from the in-vehicle communication system 10 according to the first embodiment in that the redundant domain master 14 includes a plurality of alternative operation execution units 143 (see FIG. 4) and is able to execute alternative operations of a plurality of domain masters 12 in parallel in the in-vehicle communication system according to this embodiment. The points other than this point may be similar to those in the first or second embodiment.

[Hardware Configuration of Electronic Control Unit]

Figure 8:
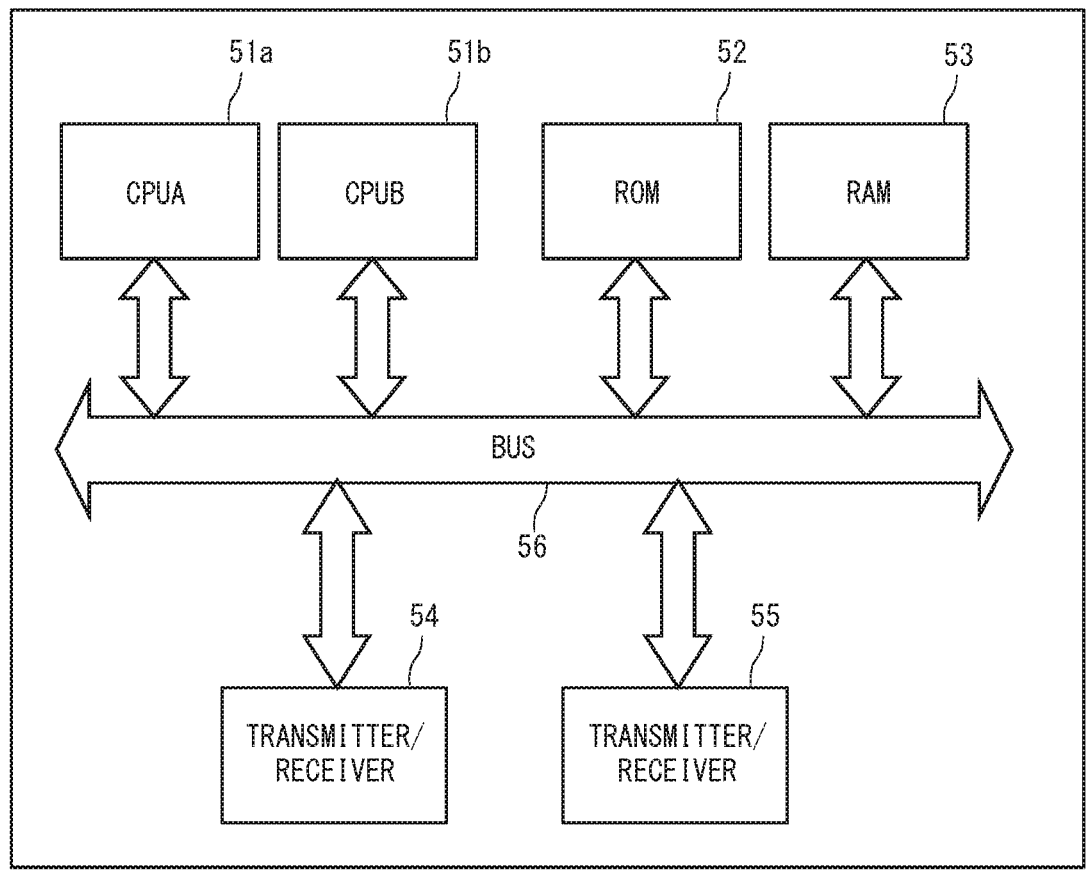
FIG. 8 is a block diagram showing a hardware configuration of an electronic control unit that can be used as a redundant domain master according to a third embodiment.

FIG. 8 shows a configuration of an electronic control unit that can be used as the redundant domain master 14 in this embodiment. An electronic control unit 50a shown in FIG. 8 is different from the electronic control unit 50 described in the first embodiment shown in FIG. 2 in that the electronic control unit 50a includes a plurality of CPUs 51a and 51b. In the electronic control unit 50a, the CPUs 51a and 51b are able to execute processing in parallel.

[Redundant Domain Master]

Figure 9:
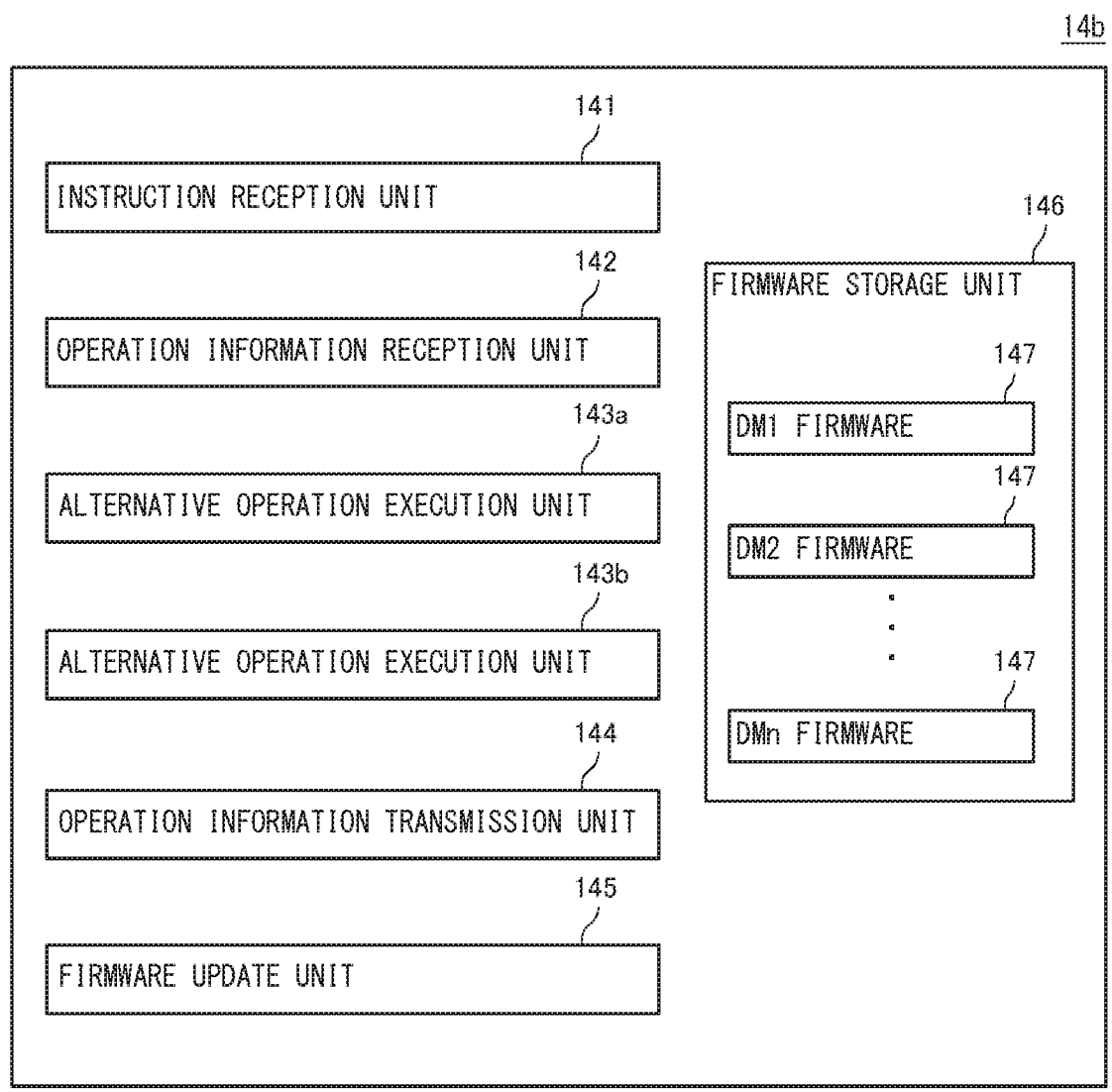
FIG. 9 is a functional block diagram showing the redundant domain master used in the third embodiment.

FIG. 9 is a functional block of the redundant domain master used in the in-vehicle communication system according to this embodiment. A redundant domain master 14b used in this embodiment includes two alternative operation execution units 143a and 143b. The alternative operation execution unit 143a is achieved by the CPU 51a (see FIG. 8) operating in accordance with the firmware read out from the ROM 52. The alternative operation execution unit 143b is achieved by, for example, the CPU 51b operating in accordance with the firmware read out from the ROM 52.

In the redundant domain master 14b, the domain master 12 whose operation is alternatively performed by the alternative operation execution unit 143a (CPU 51a) and the domain master 12 whose operation is alternatively performed by the alternative operation execution unit 143b (CPU 51b) may be determined in advance. In which CPU (alternative operation execution unit) and the alternative operation of which domain master 12 will be executed are managed, for example, using a management table.

Specifically, the alternative operation execution unit 143a may perform the alternative operations of the odd-numbered domain masters 12, i.e., the domain masters (DM(2i+1)), where i is any integer. Further, the alternative operation execution unit 143b may perform the alternative operations of the even-numbered domain masters 12, i.e., the domain masters (DM(2i)). It is assumed here that $2i+1 \leq n$ or $2i \leq n$ is satisfied. In this case, the odd-numbered domain masters 12 and the even-numbered domain masters 12 are able to execute the update of the firmware in parallel.

[Conclusion]

In this embodiment, the redundant domain master 14b includes the alternative operation execution units 143a and 143b, and is able to execute the alternative operations of the plurality of domain masters 12 in parallel. In this embodiment, for example, while the alternative operation of one domain master 12 is being executed in the redundant domain master 14b, the alternative operation of another domain master 12 can be executed. It is therefore possible to concurrently execute update of the firmware of the plurality of domain masters 12.

Modified Example

While the example in which the redundant domain master 14 is configured to be able to perform the alternative operations of all the domain masters 12 has been described in the aforementioned embodiments, this is merely an example. The plurality of domain masters 12 may include a domain master whose firmware will not be updated during the travelling. In this case, the redundant domain master 14 may not be configured to be able to perform the alternative operation of this domain master. In other words, the firmware storage unit 146 (see FIG. 4) of the redundant domain master 14 may not store the firmware of all the domain masters 12 and may not store the firmware of a specific domain master 12 whose firmware will not be updated during the travelling.

In the aforementioned embodiments, the low-speed network 13 may not be constituted by a single kind of network. For example, in the second embodiment, it is not necessary that all the low-speed networks 13 in the respective functional domains be constituted by LIN. In the in-vehicle communication system 10, both the low-speed networks 13 constituted by CAN and the low-speed networks 13 constituted by LIN may be included. Specifically, the low-speed networks 13 may be constituted by CAN in one functional domain and the low-speed networks 13 may be constituted by LIN in another functional domain.

While the example in which the electronic control unit 50a includes the two CPUs 51a and 51b has been described in the third embodiment, it is sufficient that the electronic control unit 50a include a plurality of CPUs and the number of CPUs is not limited to two. Further, the number of alternative operation execution units in the redundant domain master 14 and the number of CPUs included in the electronic control unit 50a may not coincide with each other. Furthermore, it is sufficient that the electronic control unit used in the third embodiment be able to execute the operations of the plurality of domain masters 12 in parallel and the electronic control unit used in the third embodiment may not necessarily include a plurality of CPUs. One CPU whose processing capability is high may be used and this CPU may execute the alternative operations of the plurality of domain masters 12.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

For example, while one or all of the aforementioned embodiments may be described as shown in the following Supplementary Notes, they are not limited to them.

[Supplementary Note 1]
An in-vehicle communication system comprising:
a plurality of domain masters, each of which operates based on firmware;
a redundant domain master configured to be able to perform alternative operations of the domain masters;
a radio communication circuit configured to receive update data of the firmware from a communication apparatus outside a vehicle; and
a gateway configured to transmit the update data to a domain master whose firmware is to be updated, wherein
each of the plurality of domain masters comprises:
an operation information transmitter configured to transmit first operation information generated by operating based on the firmware to the redundant domain master prior to the update of the firmware;
an alternative operation instruction module configured to instruct the redundant domain master to perform the alternative operation of the domain master;
an update data receiver configured to receive the update data from the gateway;
a firmware update module configured to stop operating based on the firmware and update the firmware based on the update data;
an operation information receiver configured to receive second operation information generated in the alternative operation executed by the redundant domain master from the redundant domain master; and
an operation switch module configured to start an operation based on the firmware updated by the firmware update module using the second operation information received by the operation information receiver, and
the redundant domain master comprises:
an operation information receiver configured to receive the first operation information from the domain master whose firmware is to be updated;
an alternative operation execution module configured to start the alternative operation of the domain master to be updated using the second operation information received by the operation information receiver; and
an operation information transmitter configured to transmit the second operation information to the domain master whose firmware is to be updated.

[Supplementary Note 2]
The in-vehicle communication system according to Supplementary Note 1, wherein each of the plurality of domain masters is connected to one or more electronic control devices in each domain via a first network and is connected to the gateway via a second network, and the redundant domain master is connected to the plurality of domain masters and one or more electronic control devices in each domain via the first network of each domain and is connected to the gateway via the second network.

[Supplementary Note 3]
The in-vehicle communication system according to Supplementary Note 2, wherein the operation information transmitter of the domain master transmits the first operation information to the redundant domain master via the gateway, and the operation information transmitter of the redundant domain master transmits the second operation information to the domain master via the gateway.

[Supplementary Note 4]
The in-vehicle communication system according to Supplementary Note 1, wherein the redundant domain master further comprises a firmware storage that stores firmware of the plurality of domain masters, and the alternative operation execution module reads out firmware of the domain master to be updated from the firmware storage to start the alternative operation.

[Supplementary Note 5]

The in-vehicle communication system according to Supplementary Note 4, wherein the domain master further comprises an updated firmware transmitter configured to transmit the updated firmware to the redundant domain master after the update of the firmware, and the redundant domain master further comprises a firmware update module configured to receive the updated firmware and update the firmware stored in the firmware storage.

[Supplementary Note 6]

The in-vehicle communication system according to Supplementary Note 1, wherein the redundant domain master comprises a plurality of the alternative operation execution modules and is able to execute alternative operations of the plurality of domain masters in parallel.

[Supplementary Note 7]

The in-vehicle communication system according to Supplementary Note 1, wherein each of the plurality of domain masters controls communication in the first network in a domain connected to one or more electronic control device based on the firmware.

[Supplementary Note 8]

The in-vehicle communication system according to Supplementary Note 7, wherein the first operation information and the second operation information comprise communication monitoring information of the first network in the domain and register configuration information.

[Supplementary Note 9]

A domain master comprising:

an operation information transmitter configured to transmit, prior to update of firmware, first operation information generated by operating based on the firmware to a redundant domain master configured to be able to perform an alternative operation of a domain master;

an alternative operation instruction module configured to instruct the redundant domain master to perform the alternative operation;

an update data receiver configured to receive, from a gateway that transmits update data of the firmware received from a communication apparatus outside a vehicle to a domain master whose firmware is to be updated, the update data;

a firmware update module configured to stop operating based on the firmware and update the firmware based on the update data;

an operation information receiver configured to receive second operation information generated in the alternative operation executed in the redundant domain master from the redundant domain master; and an operation switch module configured to start an operation based on the firmware updated by the firmware update module using second operation information received by the operation information receiver.

[Supplementary Note 10]

A redundant domain master comprising:

an operation information receiver configured to receive first operation information generated by operating based on firmware from a domain master whose firmware is to be updated among a plurality of domain masters, each of which operates based on the firmware;

an alternative operation execution module configured to start an alternative operation of the domain master to be updated using the first operation information received by the operation information receiver; and an operation information transmitter configured to transmit second operation information generated in the alternative operation to the domain master whose firmware is to be updated.

[Supplementary Note 11]

A firmware update method comprising:

transmitting update data of firmware from a gateway apparatus connected to a plurality of domain masters, each of which operates based on firmware, and a redundant domain master configured to be able to perform alternative operations of the plurality of domain masters, to a domain master whose firmware is to be updated;

stopping an operation based on the firmware in the domain master to be updated and transmitting first operation information generated by operating based on the firmware to the redundant domain master;

starting an alternative operation of the domain master to be updated using the first operation information received from the domain master to be updated in the redundant domain master;

receiving the update data in the domain master to be updated;

executing update of firmware based on the received update data in the domain master to be updated;

stopping the alternative operation in the redundant domain master and transmitting second operation information generated in the alternative operation to the domain master to be updated; and starting an operation based on the updated firmware using the second operation information received from the redundant domain master in the domain master to be updated.

[Supplementary Note 12]

A firmware update method in an in-vehicle communication system comprising a plurality of domain masters, each of which operates based on firmware, a redundant domain master configured to be able to perform alternative operations of the plurality of domain masters, and a gateway apparatus connected to the plurality of domain masters and the redundant domain master, the method comprising:

receiving update data of the firmware from the gateway apparatus;

stopping an operation based on the firmware and transmitting first operation information generated by operating based on the firmware to the redundant domain master;

updating the firmware based on the received update data;

receiving second operation information generated in the alternative operation from the redundant domain master; and starting an operation based on the updated firmware using the received second operation information.

[Supplementary Note 13]

A firmware update method in a network system comprising a plurality of domain masters, each of which operates based on firmware, a redundant domain master configured to be able to perform alternative operations of the plurality of domain masters, and a gateway apparatus connected to the plurality of domain masters and the redundant domain master, the method comprising:

receiving first operation information generated by operating based on the firmware from the domain master whose firmware is to be updated;

starting the alternative operation of the domain master to be updated using the received first operation information; and stopping, after the firmware is updated in the domain master to be updated, the alternative operation, and transmitting second operation information generated in the alternative operation to the domain master to be updated.

What is claimed is:

1. A firmware update method for an in-vehicle communication system including a domain master operating based on firmware, a redundant domain master, and a gateway apparatus connected to the domain master and the redundant domain master, the firmware update method comprising:
    transmitting first operation information generated by operating the domain master based on the firmware, from the domain master to the redundant domain master, and then stopping the operation based on the firmware in the domain master;
    starting an alternative operation of the domain master using the first operation information in the redundant domain master;
    providing update data of the firmware from the gateway apparatus to the domain master;
    executing update of the firmware based on the update data in the domain master;
    stopping the alternative operation in the redundant domain master and transmitting second operation information generated in the alternative operation from the redundant domain master to the domain master;
    starting an operation based on the updated firmware using the second operation information in the domain master; and
    transmitting the updated firmware from the domain master to the redundant domain master after the update of the firmware in the domain master,
    wherein the redundant domain master includes a firmware storage and stores the updated firmware in the firmware storage after the transmitting of the updated firmware from the domain master.

2. The firmware update method according to claim 1, wherein the domain master is connected to one or more electronic control devices via a first network and is connected to the gateway via a second network, and the redundant domain master is connected to the domain master and the electronic control devices via the first network and is connected to the gateway via the second network.

3. The firmware update method according to claim 2, wherein the redundant domain master reads out the firmware of the domain master from the firmware storage to start the alternative operation.

4. The firmware update method according to claim 3, wherein the domain master controls communication in the first network in a domain connected to the electronic control devices based on the firmware.

5. The firmware update method according to claim 4, wherein the first operation information and the second operation information include communication monitoring information of the first network in the domain.

6. A firmware update method for an in-vehicle communication system including a plurality of domain masters, each of which operates based on firmware, a redundant domain master, and a gateway apparatus connected to the plurality of domain masters and the redundant domain master, the firmware update method comprising:
    transmitting first operation information, generated by operating one of the plurality of domain masters to be updated based on the firmware from the one of the plurality of domain masters to be updated, to the redundant domain master and then stopping the operation based on the firmware of the one of the plurality of domain masters to be updated;
    starting an alternative operation of the one of the plurality of domain masters to be updated, using the first operation information in the redundant domain master;
    providing update data of the firmware from the gateway apparatus to the one of the plurality of domain masters to be updated;
    executing update of the firmware based on the update data in the one of the domain masters to be updated;
    stopping the alternative operation in the redundant domain master and transmitting second operation information, generated in the alternative operation, from the redundant domain master to the one of the domain masters;
    starting an operation based on the updated firmware using the second operation information in the one of the domain masters; and
    transmitting the updated firmware from the one of the domain masters to the redundant domain master after the update of the firmware in the one of the domain masters,
    wherein the redundant domain master includes a firmware storage storing firmware of the plurality of domain masters and stores the updated firmware in the firmware storage after receiving the updated firmware from the domain master.

7. The firmware update method according to claim 6, wherein each of the plurality of domain masters is connected to one or more electronic control devices in each domain via a first network and is connected to the gateway via a second network, and the redundant domain master is connected to the plurality of domain masters and the electronic control devices in each domain via the first network of each domain and is connected to the gateway via the second network.

8. The firmware update method according to claim 6, wherein the redundant domain master reads out the firmware of the one of the domain masters to be updated from the firmware storage to start the alternative operation.

9. The firmware update method according to claim 7, wherein each of the plurality of domain masters controls communication in the first network in a domain connected to the electronic control devices based on the firmware.

10. The firmware update method according to claim 7, wherein the first operation information and the second operation information include communication monitoring information of the first network in the domain.

* * * * *